(12) United States Patent
Shi et al.

(10) Patent No.: US 10,701,706 B2
(45) Date of Patent: Jun. 30, 2020

(54) RESOURCE ALLOCATION METHOD, APPARATUS, AND SYSTEM, AND BASE STATION

(71) Applicant: HUAWEI TECHNOLOGIES CO., LTD., Shenzhen (CN)

(72) Inventors: Zhenyu Shi, Shanghai (CN); Yi Wang, Shanghai (CN); Lei Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 15/821,711

(22) Filed: Nov. 22, 2017

(65) Prior Publication Data

US 2018/0098332 A1    Apr. 5, 2018

Related U.S. Application Data

(63) Continuation of application No. PCT/CN2015/079632, filed on May 23, 2015.

(51) Int. Cl.
  *H04W 28/20*      (2009.01)
  *H04W 28/22*      (2009.01)
  (Continued)

(52) U.S. Cl.
  CPC ......... *H04W 72/085* (2013.01); *H04W 28/20* (2013.01); *H04W 28/22* (2013.01);
  (Continued)

(58) Field of Classification Search
  CPC ... H04W 72/085; H04W 28/20; H04W 28/22; H04W 72/0406; H04W 88/08; H04W 92/20; H04W 88/02; H04W 72/0426
  See application file for complete search history.

(56) References Cited

U.S. PATENT DOCUMENTS

2008/0192773 A1    8/2008   Ou et al.
2011/0310789 A1   12/2011   Hu et al.
                  (Continued)

FOREIGN PATENT DOCUMENTS

CN    102118856 A    7/2011
CN    102137498 A    7/2011
              (Continued)

*Primary Examiner* — Moo Jeong
(74) *Attorney, Agent, or Firm* — Kilpatrick Townsend & Stockton LLP

(57) ABSTRACT

Embodiments provide a resource allocation method. The method includes: obtaining, by a first base station, an access transmission rate of at least one second base station, where the access transmission rate is a ratio of a total throughput to a total bandwidth occupied by all the user equipments. The throughput being of all user equipments for which the at least one second base station performs scheduling, The method further includes determining, by the first base station, resource allocation information of an access link and a backhaul link of the at least one second base station according to the access transmission rate and a backhaul transmission rate of the at least one second base station, and sending the resource allocation information. The backhaul transmission rate is a ratio of a total throughput of the backhaul link of the at least one second base station to a total bandwidth of the backhaul link.

15 Claims, 7 Drawing Sheets

(51) Int. Cl.
  *H04W 72/04* (2009.01)
  *H04W 72/08* (2009.01)
  *H04W 88/02* (2009.01)
  *H04W 88/08* (2009.01)
  *H04W 92/20* (2009.01)

(52) U.S. Cl.
  CPC ........ *H04W 72/0406* (2013.01); *H04W 88/02* (2013.01); *H04W 88/08* (2013.01); *H04W 92/20* (2013.01)

(56) References Cited

U.S. PATENT DOCUMENTS

| | | | |
|---|---|---|---|
| 2013/0034043 A1 | 2/2013 | Yu et al. | |
| 2013/0090121 A1* | 4/2013 | Zhang | H04W 28/08 455/450 |
| 2014/0321282 A1 | 10/2014 | Pragada et al. | |
| 2015/0071248 A1* | 3/2015 | Faerber | H04W 36/0055 370/331 |
| 2019/0313472 A1* | 10/2019 | Choi | H04W 16/26 |

FOREIGN PATENT DOCUMENTS

| | | |
|---|---|---|
| CN | 102948234 A | 2/2013 |
| EP | 2556709 B1 | 6/2014 |
| KR | 20140116090 A | 10/2014 |
| WO | 2011126437 A1 | 10/2011 |

\* cited by examiner

RESOURCE ALLOCATION METHOD, APPARATUS, AND SYSTEM, AND BASE STATION

CROSS-REFERENCE TO RELATED APPLICATIONS

This application is a continuation of International Application No. PCT/CN2015/079632, filed on May 23, 2015, the disclosure of which is hereby incorporated by reference in its entirety.

TECHNICAL FIELD

The present invention relates to the mobile communications field, and in particular, to a resource allocation method, apparatus, and system, and a base station.

BACKGROUND

With popularization of mobile devices such as a mobile phone and a tablet computer, a user has an increasingly high requirement on communication. In a next-generation 5th generation wireless communications technology (5G), a higher requirement is imposed on a data transmission rate, communication quality, and a quantity of users who can connect to a network. In an existing 4th generation wireless communications technology (4G), most of used spectrum resources are less than 6 GHz, and are referred to as a low-frequency band. These spectrum resources have been excessively developed, and are hard to meet a gigabit communication requirement in the next-generation wireless communications technology. However, on a high-frequency band greater than 6 GHz, a large quantity of available bandwidths can be still provided.

To use resources on the high-frequency band, currently, an LTE hybrid networking manner is proposed in which high-frequency communication is added on a basis of existing low-frequency communication. That is, high-frequency communication is added on a basis of the existing low-frequency communication, so as to improve an overall network throughput. This hybrid networking manner mainly includes a low-frequency base station, a high-frequency base station, and user equipment. A hybrid networking structure relates to not only an access between the user equipment and the high-frequency base station, but also a backhaul between each high-frequency base station and the low-frequency base station. Both access between the user equipment and the high-frequency base station and backhaul between the high-frequency base station and the low-frequency base station are implemented on a same continuous spectrum, and share a time-frequency resource. Therefore, different time-frequency resources need to be allocated to an access link between the user equipment and the high-frequency base station and a backhaul link between the high-frequency base station and the low-frequency base station.

SUMMARY

Implementation manners of the present invention disclose a resource allocation method, so as to dynamically adjust transmission resource allocation of an access link and a backhaul link of a base station.

According to a first aspect, an implementation manner of the present invention puts forward a resource allocation method, including:

obtaining, by a first base station, an access transmission rate of at least one second base station, where the access transmission rate is a ratio of a total throughput, of all user equipments for which the at least one second base station performs scheduling, to a total bandwidth occupied by all the user equipments, and the at least one second base station accesses the first base station by using a backhaul link;

determining, by the first base station, resource allocation information of an access link and the backhaul link of the at least one second base station according to the access transmission rate of the at least one second base station and a backhaul transmission rate of the at least one second base station, where the backhaul transmission rate is a ratio of a total throughput of the backhaul link of the at least one second base station to a total bandwidth of the backhaul link; and sending, by the first base station, the resource allocation information of the access link and the backhaul link to the at least one second base station.

In a first possible implementation manner of the first aspect, the method further includes:

sending, by the first base station, the resource allocation information of the access link and the backhaul link to at least one user equipment, so that the at least one user equipment performs communication according to the resource allocation information of the access link and the backhaul link.

In a second possible implementation manner of the first aspect, the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station includes:

determining a first ratio of a minimum access transmission rate to a minimum backhaul transmission rate according to access transmission rates of the at least two second base stations and backhaul transmission rates of the at least two second base stations; and determining resource allocation information of access links and backhaul links of the at least two base stations according to the first ratio.

In a third possible implementation manner of the first aspect, the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station includes:

determining a first ratio of a maximum access transmission rate to a maximum backhaul transmission rate according to access transmission rates of the at least two second base stations and backhaul transmission rates of the at least two second base stations; and determining resource allocation information of access links and backhaul links of the at least two base stations according to the first ratio.

In a fourth possible implementation manner of the first aspect, the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station includes:

determining a first ratio of an average access transmission rate to an average backhaul transmission rate according to access transmission rates of the at least two second base stations and backhaul transmission rates of the at least two second base stations; and determining resource allocation information of access links and backhaul links of the at least two base stations according to the first ratio.

In a fifth possible implementation manner of the first aspect, the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station includes:

obtaining, according to an access transmission rate of each second base station and a backhaul transmission rate of each second base station, a maximum throughput of each second base station and a backhaul bandwidth corresponding to the maximum throughput;

obtaining, according to the backhaul bandwidths corresponding to the maximum throughputs of the at least two second base stations, a backhaul bandwidth that maximizes a sum of overall throughputs of the at least two second base stations; determining a second base station corresponding to the backhaul bandwidth that maximizes the sum of the overall throughputs of the at least two second base stations; and determining a first ratio of an access transmission rate of the corresponding second base station to a backhaul transmission rate of the corresponding second base station; and determining resource allocation information of access links and backhaul links of the at least two base stations according to the first ratio.

In a sixth possible implementation manner of the first aspect, the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station includes:

collecting statistics about throughputs of each second base station per historical unit time, and obtaining an average historical throughput and a maximum throughput per unit time according to the throughputs of each second base station per historical unit time;

determining a maximum throughput per current unit time according to an access transmission rate of each second base station and a backhaul transmission rate of each second base station;

determining, as a satisfaction factor, a second ratio of the maximum throughput of each second base station per current unit time to a historical throughput;

comparing the satisfaction factors of the at least two second base stations, determining a maximum satisfaction factor and a corresponding second base station, and determining a first ratio of an access transmission rate of the corresponding second base station to a backhaul transmission rate of the corresponding second base station; and determining resource allocation information of access links and backhaul links of the at least two base stations according to the first ratio.

With reference to any one of the first to sixth possible implementation manners of the first aspect, in a seventh possible implementation manner of the first aspect, the method further includes:

setting one or more preset resource allocation values and one or more ratio ranges, wherein each preset resource allocation value is corresponding to one ratio range; and the determining resource allocation information of access links and backhaul links of the at least two base stations according to the first ratio specifically includes:

determining, by the first base station, a corresponding ratio range according to the first ratio; and matching a corresponding preset resource allocation value according to the corresponding ratio range, and determining the matched preset resource allocation value as the resource allocation information of the access links and the backhaul links of the at least two base stations.

With reference to any one of the first aspect, or the first to the sixth possible implementation manners of the first aspect, in an eighth possible implementation manner of the first aspect, the second base station is a high-frequency base station.

According to a second aspect, an implementation manner of the present invention further puts forward a resource allocation method, including:

obtaining, by a second base station, an access transmission rate, and sending the access transmission rate to a first base station, where the access transmission rate is a ratio of a total throughput, of all user equipments for which the second base station performs scheduling, to a total bandwidth occupied by all the user equipments, and the second base station accesses the first base station by using a wireless backhaul link;

receiving, by the second base station, resource allocation information of an access link and the backhaul link from the first base station, where the resource allocation information of the access link and the backhaul link is determined by the first base station according to the access transmission rate of the second base station and a backhaul transmission rate of the second base station, and the backhaul transmission rate is a ratio of a total throughput of the backhaul link of the second base station to a total bandwidth of the backhaul link; and allocating, by the second base station, a transmission resource to the access link and the backhaul link of the second base station according to the resource allocation information of the access link and the backhaul link.

In a first possible implementation manner of the second aspect, when there are at least two second base stations, that the resource allocation information of the access link and the backhaul link is determined by the first base station according to the access transmission rate of the second base station and a backhaul transmission rate of the second base station includes:

determining a first ratio of a minimum access transmission rate to a minimum backhaul transmission rate according to access transmission rates of the at least two second base stations and backhaul transmission rates of the at least two second base stations; and determining resource allocation information of access links and backhaul links of the at least two base stations according to the first ratio.

In a second possible implementation manner of the second aspect, when there are at least two second base stations, that the resource allocation information of the access link and the backhaul link is determined by the first base station according to the access transmission rate of the second base station and a backhaul transmission rate of the second base station includes:

determining a first ratio of a maximum access transmission rate to a maximum backhaul transmission rate according to access transmission rates of the at least two second base stations and backhaul transmission rates of the at least two second base stations; and determining resource allocation information of access links and backhaul links of the at least two base stations according to the first ratio.

In a third possible implementation manner of the second aspect, when there are at least two second base stations, that the resource allocation information of the access link and the backhaul link is determined by the first base station according to the access transmission rate of the second base station and a backhaul transmission rate of the second base station includes:

determining a first ratio of an average access transmission rate to an average backhaul transmission rate according to access transmission rates of the at least two second base stations and backhaul transmission rates of the at least two second base stations; and determining resource allocation information of access links and backhaul links of the at least two base stations according to the first ratio.

In a fourth possible implementation manner of the second aspect, when there are at least two second base stations, that the resource allocation information of the access link and the backhaul link is determined by the first base station according to the access transmission rate of the second base station and a backhaul transmission rate of the second base station includes:

obtaining, according to an access transmission rate of each second base station and a backhaul transmission rate of each second base station, a maximum throughput of each second base station and a backhaul bandwidth corresponding to the maximum throughput;

obtaining, according to the backhaul bandwidths corresponding to the maximum throughputs of the at least two second base stations, a backhaul bandwidth that maximizes a sum of overall throughputs of the at least two second base stations; determining a second base station corresponding to the backhaul bandwidth that maximizes the sum of the overall throughputs of the at least two second base stations; and determining a first ratio of an access transmission rate of the corresponding second base station to a backhaul transmission rate of the corresponding second base station; and determining resource allocation information of access links and backhaul links of the at least two base stations according to the first ratio.

In a fifth possible implementation manner of the second aspect, when there are at least two second base stations, that the resource allocation information of the access link and the backhaul link is determined by the first base station according to the access transmission rate of the second base station and a backhaul transmission rate of the second base station includes:

collecting statistics about throughputs of each second base station per historical unit time, and obtaining an average historical throughput and a maximum throughput per unit time according to the throughputs of each second base station per historical unit time;

determining a maximum throughput per current unit time according to an access transmission rate of each second base station and a backhaul transmission rate of each second base station;

determining, as a satisfaction factor, a second ratio of the maximum throughput of each second base station per current unit time to a historical throughput;

comparing the satisfaction factors of the at least two second base stations, determining a maximum satisfaction factor and a corresponding second base station, and determining a first ratio of an access transmission rate of the corresponding second base station to a backhaul transmission rate of the corresponding second base station; and determining resource allocation information of access links and backhaul links of the at least two second base stations according to the first ratio.

With reference to any one of the first to the fifth possible implementation manners of the second aspect, in a sixth possible implementation manner of the second aspect, that the resource allocation information of the access link and the backhaul link is determined by the first base station according to the access transmission rate of the second base station and a backhaul transmission rate of the second base station further includes:

setting one or more preset resource allocation values and one or more ratio ranges, where each preset resource allocation value is corresponding to one ratio range; and the determining resource allocation information of access links and backhaul links of the at least two base stations according to the first ratio specifically includes:

determining, by the first base station, a corresponding ratio range according to the first ratio; and matching a corresponding preset resource allocation value according to the corresponding ratio range, and determining the matched preset resource allocation value as the resource allocation information of the access links and the backhaul links of the at least two base stations.

With reference to any one of the second aspect, or the first to the fifth possible implementation manners of the second aspect, in a seventh possible implementation manner of the second aspect, the method further includes:

sending, by the second base station, the resource allocation information of the access link and the backhaul link to at least one user equipment, so that the at least one user equipment performs communication according to the resource allocation information of the access link and the backhaul link.

With reference to any one of the second aspect, or the first to the fifth possible implementation manners of the second aspect, in an eighth possible implementation manner of the second aspect, the second base station is a high-frequency base station.

According to a third aspect, an implementation manner of the present invention puts forward a resource allocation apparatus, including:

a first obtaining module, configured to obtain an access transmission rate of at least one second base station, where the access transmission rate is a ratio of a total throughput, of all user equipments for which the at least one second base station performs scheduling, to a total bandwidth occupied by all the user equipments, and the at least one second base station accesses the resource allocation apparatus by using a backhaul link;

a determining module, configured to determine resource allocation information of an access link and the backhaul link of the at least one second base station according to the access transmission rate of the at least one second base station and a backhaul transmission rate of the at least one second base station, where the backhaul transmission rate is a ratio of a total throughput of the backhaul link of the at least one second base station to a total bandwidth of the backhaul link; and a first sending module, configured to send the resource allocation information of the access link and the backhaul link to the at least one second base station.

In a first possible implementation manner of the third aspect, the first sending module is further configured to send the resource allocation information of the access link and the backhaul link to at least one user equipment, so that the at least one user equipment performs communication according to the resource allocation information of the access link and the backhaul link.

In a second possible implementation manner of the third aspect, the at least one second base station is specifically at least two second base stations, and the determining module is specifically configured to:

determine a first ratio of a minimum access transmission rate to a minimum backhaul transmission rate according to access transmission rates of the at least two second base stations and backhaul transmission rates of the at least two second base stations; and determine resource allocation information of access links and backhaul links of the at least two base stations according to the first ratio.

In a third possible implementation manner of the third aspect, the at least one second base station is specifically at least two second base stations, and the determining module is specifically configured to:

determine a first ratio of a maximum access transmission rate to a maximum backhaul transmission rate according to access transmission rates of the at least two second base stations and backhaul transmission rates of the at least two second base stations; and determine resource allocation information of access links and backhaul links of the at least two base stations according to the first ratio.

In a fourth possible implementation manner of the third aspect, the at least one second base station is specifically at least two second base stations, and the determining module is specifically configured to:

determine a first ratio of an average access transmission rate to an average backhaul transmission rate according to access transmission rates of the at least two second base stations and backhaul transmission rates of the at least two second base stations; and determine resource allocation information of access links and backhaul links of the at least two base stations according to the first ratio.

In a fifth possible implementation manner of the third aspect, the at least one second base station is specifically at least two second base stations, and the determining module is specifically configured to:

obtain, according to an access transmission rate of each second base station and a backhaul transmission rate of each second base station, a maximum throughput of each second base station and a backhaul bandwidth corresponding to the maximum throughput;

obtain, according to the backhaul bandwidths corresponding to the maximum throughputs of the at least two second base stations, a backhaul bandwidth that maximizes a sum of overall throughputs of the at least two second base stations; determine a second base station corresponding to the backhaul bandwidth that maximizes the sum of the overall throughputs of the at least two second base stations; and determine a first ratio of an access transmission rate of the corresponding second base station to a backhaul transmission rate of the corresponding second base station; and determine resource allocation information of access links and backhaul links of the at least two base stations according to the first ratio.

In a sixth possible implementation manner of the third aspect, the at least one second base station is specifically at least two second base stations, and the determining module is specifically configured to:

collect statistics about throughputs of each second base station per historical unit time, and obtain an average historical throughput and a maximum throughput per unit time according to the throughputs of each second base station per historical unit time;

determine a maximum throughput per current unit time according to an access transmission rate of each second base station and a backhaul transmission rate of each second base station;

determine, as a satisfaction factor, a second ratio of the maximum throughput of each second base station per current unit time to a historical throughput;

compare the satisfaction factors of the at least two second base stations, determine a maximum satisfaction factor and a corresponding second base station, and determine a first ratio of an access transmission rate of the corresponding second base station to a backhaul transmission rate of the corresponding second base station; and determine resource allocation information of access links and backhaul links of the at least two base stations according to the first ratio.

With reference to any one of the second to sixth possible implementation manners of the third aspect, in a seventh possible implementation manner of the third aspect, the apparatus further includes:

a setting module, configured to set one or more preset resource allocation values and one or more ratio ranges, where each preset resource allocation value is corresponding to one ratio range; and the determining module is configured to:

determine a corresponding ratio range according to the first ratio; and match a corresponding preset resource allocation value according to the corresponding ratio range, and determine the matched preset resource allocation value as the resource allocation information of the access links and the backhaul links of the at least two base stations.

With reference to any one of the third aspect, or the first to the sixth possible implementation manners of the third aspect, in an eighth possible implementation manner of the third aspect, the second base station is a high-frequency base station.

According to a fourth aspect, an implementation manner of the present invention puts forward a base station, including:

a second obtaining module, configured to obtain an access transmission rate of the base station, where the access transmission rate is a ratio of a total throughput, of all user equipments for which the base station performs scheduling, to a total bandwidth occupied by all the user equipments, and the base station accesses a first base station by using a wireless backhaul link;

a second sending module, configured to send the access transmission rate obtained by the second obtaining module to the first base station;

a receiving module, configured to receive resource allocation information of an access link and the backhaul link from the first base station, where the resource allocation information of the access link and the backhaul link is determined by the first base station according to the access transmission rate of the base station and a backhaul transmission rate of the base station, and the backhaul transmission rate is a ratio of a total throughput of the backhaul link of the base station to a total bandwidth of the backhaul link; and a processing module, configured to allocate a transmission resource to the access link and the backhaul link of the base station according to the resource allocation information of the access link and the backhaul link.

In a first possible implementation manner of the fourth aspect, when there are at least two base stations, that the resource allocation information of the access link and the backhaul link is determined by the first base station according to the access transmission rate of the base station and a backhaul transmission rate of the base station includes:

determining a first ratio of a minimum access transmission rate to a minimum backhaul transmission rate according to access transmission rates of the at least two base stations and backhaul transmission rates of the at least two base stations; and determining resource allocation information of access links and backhaul links of the at least two base stations according to the first ratio.

In a second possible implementation manner of the fourth aspect, when there are at least two base stations, that the resource allocation information of the access link and the backhaul link is determined by the first base station according to the access transmission rate of the base station and a backhaul transmission rate of the base station includes:

determining a first ratio of a maximum access transmission rate to a maximum backhaul transmission rate according to access transmission rates of the at least two base stations and backhaul transmission rates of the at least two base stations; and determining resource allocation information of access links and backhaul links of the at least two base stations according to the first ratio.

In a third possible implementation manner of the fourth aspect, when there are at least two base stations, that the resource allocation information of the access link and the backhaul link is determined by the first base station according to the access transmission rate of the base station and a backhaul transmission rate of the base station includes:

determining a first ratio of an average access transmission rate to an average backhaul transmission rate according to access transmission rates of the at least two base stations and backhaul transmission rates of the at least two base stations; and determining resource allocation information of access links and backhaul links of the at least two base stations according to the first ratio.

In a fourth possible implementation manner of the fourth aspect, when there are at least two base stations, that the resource allocation information of the access link and the backhaul link is determined by the first base station according to the access transmission rate of the base station and a backhaul transmission rate of the base station includes:

obtaining, according to an access transmission rate of each base station and a backhaul transmission rate of each base station, a maximum throughput of each base station and a backhaul bandwidth corresponding to the maximum throughput;

obtaining, according to the backhaul bandwidths corresponding to the maximum throughputs of the at least two base stations, a backhaul bandwidth that maximizes a sum of overall throughputs of the at least two base stations; determining a base station corresponding to the backhaul bandwidth that maximizes the sum of the overall throughputs of the at least two base stations; and determining a first ratio of an access transmission rate of the corresponding base station to a backhaul transmission rate of the corresponding base station; and determining resource allocation information of access links and backhaul links of the at least two base stations according to the first ratio.

In a fifth possible implementation manner of the fourth aspect, when there are at least two base stations, that the resource allocation information of the access link and the backhaul link is determined by the first base station according to the access transmission rate of the base station and a backhaul transmission rate of the base station includes:

collecting statistics about throughputs of each base station per historical unit time, and obtaining an average historical throughput and a maximum throughput per unit time according to the throughputs of each base station per historical unit time;

determining a maximum throughput per current unit time according to an access transmission rate of each base station and a backhaul transmission rate of each base station;

determining, as a satisfaction factor, a second ratio of the maximum throughput of each base station per current unit time to a historical throughput;

comparing the satisfaction factors of the at least two base stations, determining a maximum satisfaction factor and a corresponding base station, and determining a first ratio of an access transmission rate of the corresponding base station to a backhaul transmission rate of the corresponding base station; and determining resource allocation information of access links and backhaul links of the at least two base stations according to the first ratio.

With reference to any one of the first to the fifth possible implementation manners of the fourth aspect, in a sixth possible implementation manner of the fourth aspect, that the resource allocation information of the access link and the backhaul link is determined by the first base station according to the access transmission rate of the base station and a backhaul transmission rate of the base station further includes:

setting one or more preset resource allocation values and one or more ratio ranges, where each preset resource allocation value is corresponding to one ratio range; and the determining resource allocation information of access links and backhaul links of the at least two base stations according to the first ratio specifically includes:

determining, by the first base station, a corresponding ratio range according to the first ratio; and matching a corresponding preset resource allocation value according to the corresponding ratio range, and determining the matched preset resource allocation value as the resource allocation information of the access links and the backhaul links of the at least two base stations.

With reference to any one of the forth aspect, or the first to the fifth possible implementation manners of the forth aspect, in a seventh possible implementation manner of the forth aspect, the apparatus further includes:

a third sending module, configured to send the resource allocation information of the access link and the backhaul link to at least one user equipment, so that the at least one user equipment performs communication according to the resource allocation information of the access link and the backhaul link.

With reference to any one of the fifth aspect, or the first to the fifth possible implementation manners of the fifth aspect, in an eighth possible implementation manner of the fifth aspect, the base station is a high-frequency base station.

According to a fifth aspect, an implementation manner of the present invention puts forward a resource allocation system, including a resource allocation apparatus and at least one second base station, where the at least one second base station accesses the resource allocation apparatus by using a wireless backhaul link, and the system includes:

the resource allocation apparatus, including:
a first obtaining module, configured to obtain an access transmission rate of the at least one second base station, where the access transmission rate is a ratio of a total throughput, of all user equipments for which the at least one second base station performs scheduling, to a total bandwidth occupied by all the user equipments; a determining module, configured to determine resource allocation information of an access link and the backhaul link of the at least one second base station according to the access transmission rate of the at least one second base station and a backhaul transmission rate of the at least one second base station, where the backhaul transmission rate is a ratio of a total throughput of the backhaul link of the at least one second base station to a total bandwidth of the backhaul link; and a first sending module, configured to send the resource allocation information of the access link and the backhaul link to the at least one second base station; and the second base station, including:
a second obtaining module, configured to obtain an access transmission rate of the second base station and send the access transmission rate to the first base station, where the access transmission rate is a ratio of a total throughput, of all user equipments for which performs scheduling the second base station, to a total bandwidth occupied by all the user equipments; a second sending module, configured to send the access transmission rate obtained by the second obtaining module to the first base station; a receiving module, configured to receive resource allocation information of an access link and the backhaul link from the first base station; and a processing module, configured to allocate a transmission resource to the access link and the backhaul link of the second base station according to the resource allocation information of the access link and the backhaul link.

In a first possible implementation manner of the fifth aspect, the first sending module is further configured to send the resource allocation information of the access link and the backhaul link to at least one user equipment, so that the at least one user equipment performs communication according to the resource allocation information of the access link and the backhaul link.

In a second possible implementation manner of the fifth aspect, the second base station further includes a third sending module, configured to send the resource allocation information of the access link and the backhaul link to at least one user equipment, so that the at least one user equipment performs communication according to the resource allocation information of the access link and the backhaul link.

In a third possible implementation manner of the fifth aspect, the at least one second base station is specifically at least two second base stations, and the determining module is specifically configured to:

determine a first ratio of a minimum access transmission rate to a minimum backhaul transmission rate according to access transmission rates of the at least two second base stations and backhaul transmission rates of the at least two second base stations; and determine resource allocation information of access links and backhaul links of the at least two base stations according to the first ratio.

In a fourth possible implementation manner of the fifth aspect, the at least one second base station is specifically at least two second base stations, and the determining module is specifically configured to:

determine a first ratio of a maximum access transmission rate to a maximum backhaul transmission rate according to access transmission rates of the at least two second base stations and backhaul transmission rates of the at least two second base stations; and determine resource allocation information of access links and backhaul links of the at least two base stations according to the first ratio.

In a fifth possible implementation manner of the fifth aspect, the at least one second base station is specifically at least two second base stations, and the determining module is specifically configured to:

determine a first ratio of an average access transmission rate to an average backhaul transmission rate according to access transmission rates of the at least two second base stations and backhaul transmission rates of the at least two second base stations; and determine resource allocation information of access links and backhaul links of the at least two base stations according to the first ratio.

In a sixth possible implementation manner of the fifth aspect, the at least one second base station is specifically at least two second base stations, and the determining module is specifically configured to:

obtain, according to an access transmission rate of each second base station and a backhaul transmission rate of each second base station, a maximum throughput of each second base station and a backhaul bandwidth corresponding to the maximum throughput;

obtain, according to the backhaul bandwidths corresponding to the maximum throughputs of the at least two second base stations, a backhaul bandwidth that maximizes a sum of overall throughputs of the at least two second base stations;

determine a second base station corresponding to the backhaul bandwidth that maximizes the sum of the overall throughputs of the at least two second base stations; and determine a first ratio of an access transmission rate of the corresponding second base station to a backhaul transmission rate of the corresponding second base station; and determine resource allocation information of access links and backhaul links of the at least two base stations according to the first ratio.

In a seventh possible implementation manner of the fifth aspect, the at least one second base station is specifically at least two second base stations, and the determining module is specifically configured to:

collect statistics about throughputs of each second base station per historical unit time, and obtain an average historical throughput and a maximum throughput per unit time according to the throughputs of each second base station per historical unit time;

determine a maximum throughput per current unit time according to an access transmission rate of each second base station and a backhaul transmission rate of each second base station;

determine, as a satisfaction factor, a second ratio of the maximum throughput of each second base station per current unit time to a historical throughput; compare the satisfaction factors of the at least two second base stations, determine a maximum satisfaction factor and a corresponding second base station, and determine a first ratio of an access transmission rate of the corresponding second base station to a backhaul transmission rate of the corresponding second base station; and determine resource allocation information of access links and backhaul links of the at least two base stations according to the first ratio.

With reference to any one of the third to the seventh possible implementation manners of the fifth aspect, in an eighth possible implementation manner of the fifth aspect, the resource allocation apparatus further includes:

a setting module, configured to set one or more preset resource allocation values and one or more ratio ranges, where each preset resource allocation value is corresponding to one ratio range; and the determining module is configured to:

determine a corresponding ratio range according to the first ratio; and match a corresponding preset resource allocation value according to the corresponding ratio range, and determine the matched preset resource allocation value as the resource allocation information of the access links and the backhaul links of the at least two base stations.

With reference to any one of the fifth aspect, or the first to the seventh possible implementation manners of the fifth aspect, in a ninth possible implementation manner of the fifth aspect, the second base station is a high-frequency base station.

In the resource allocation method disclosed in the implementation manners of the present invention, a first base station obtains access transmission rates and backhaul transmission rates of at least two second base stations; determines resource allocation information of access links and backhaul links of the at least two second base stations; and dynamically adjusts a resource allocation ratio between the access link and the backhaul link of the second base station according to the resource allocation information, so as to implement dynamic resource allocation and improve resource utilization.

BRIEF DESCRIPTION OF DRAWINGS

To describe the technical solutions in implementation manners of the present invention more clearly, the following briefly describes the accompanying drawings required for describing the implementation manners or the prior art. Apparently, the accompanying drawings in the following description show some implementation manners of the present invention, and persons of ordinary skill in the art may still derive other drawings from these accompanying drawings without creative efforts.

DESCRIPTION OF EMBODIMENTS

To make the objectives, technical solutions, and advantages of the implementation manners of the present invention clearer, the following clearly describes the technical solutions in the implementation manners of the present invention with reference to the accompanying drawings in the implementation manners of the present invention. Apparently, the described implementation manners are some but not all of the implementation manners of the present invention. All other implementation manners obtained by persons of ordinary skill in the art based on the implementation manners of the present invention without creative efforts shall fall within the protection scope of the present invention.

Figure 1:
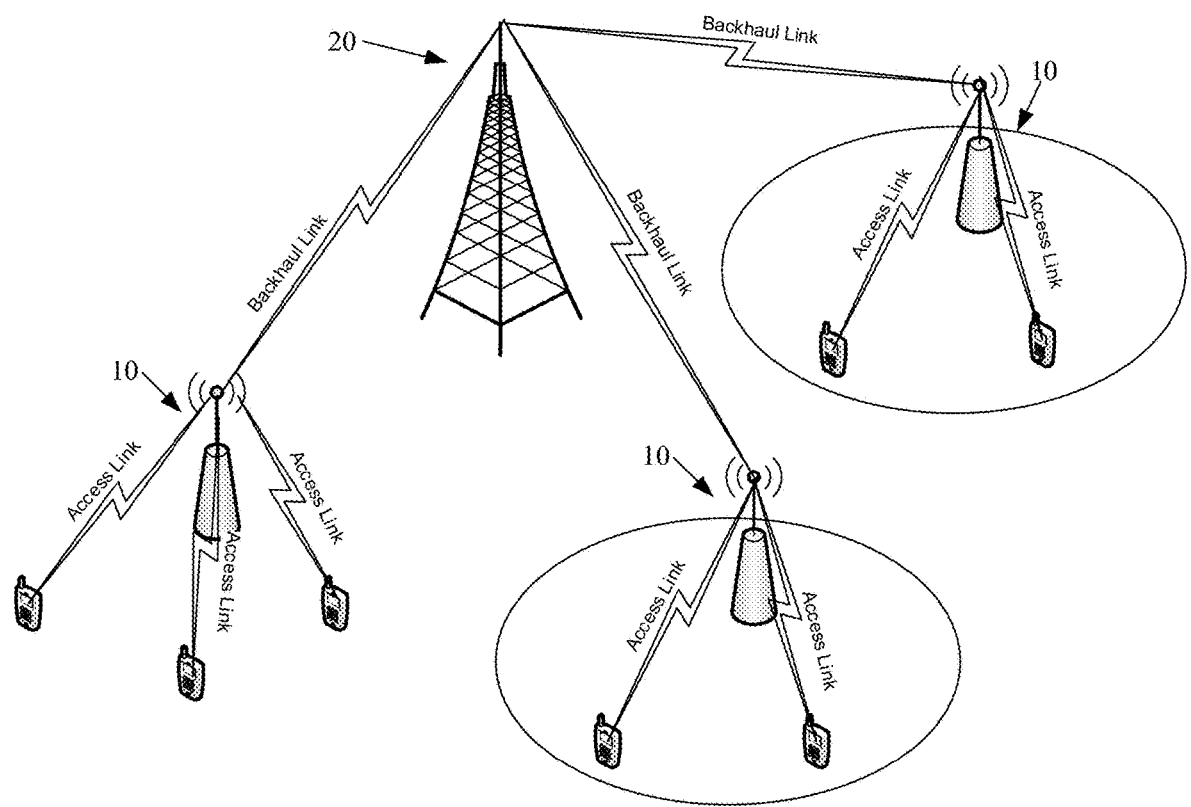
FIG. 1 is a schematic diagram of an application scenario of a system according to an implementation manner of the present invention.

Referring to FIG. 1, FIG. 1 is a schematic diagram of a scenario of a system including one first base station 20, multiple second base stations 10, and multiple user equipments (UE). In this implementation manner, the first base station is a low-frequency base station, and specifically refers to a base station that uses a spectrum resource less than 6 GHz. In another implementation manner, the first base station may be another network device such as a network controller. The type of the first base station is thus not intended to be limited to the examples described and illustrated herein. The second base station is a high-frequency base station, and specifically refers to a base station that uses a spectrum resource greater than 6 GHz. The second base station accesses the first base station through a backhaul link, and is connected to at least one user equipment through an access link. The first base station performs control information transmission with the second base station and the user equipment on a low-frequency band. The first base station may perform data transmission with the user equipment on a low-frequency band. The second base station performs data transmission with the user equipment on a high-frequency band, so as to improve system communication efficiency. It should be noted that the quantity of first base stations, the quantity of second base stations, and the quantity of user equipment are not limited to the examples described and illustrated herein. That is in the network structure described and illustrated herein, the quantity of first base stations, the quantity of second base stations, and the quantity of user equipment are merely shown as examples. In some other implementations, the network structure in accordance with the disclosure may include multiple first base stations, multiple second base stations, and multiple user equipments. In still other implementations, the network structure in accordance with the disclosure may include one first base station, one second base station, and one user equipment.

Figure 2:
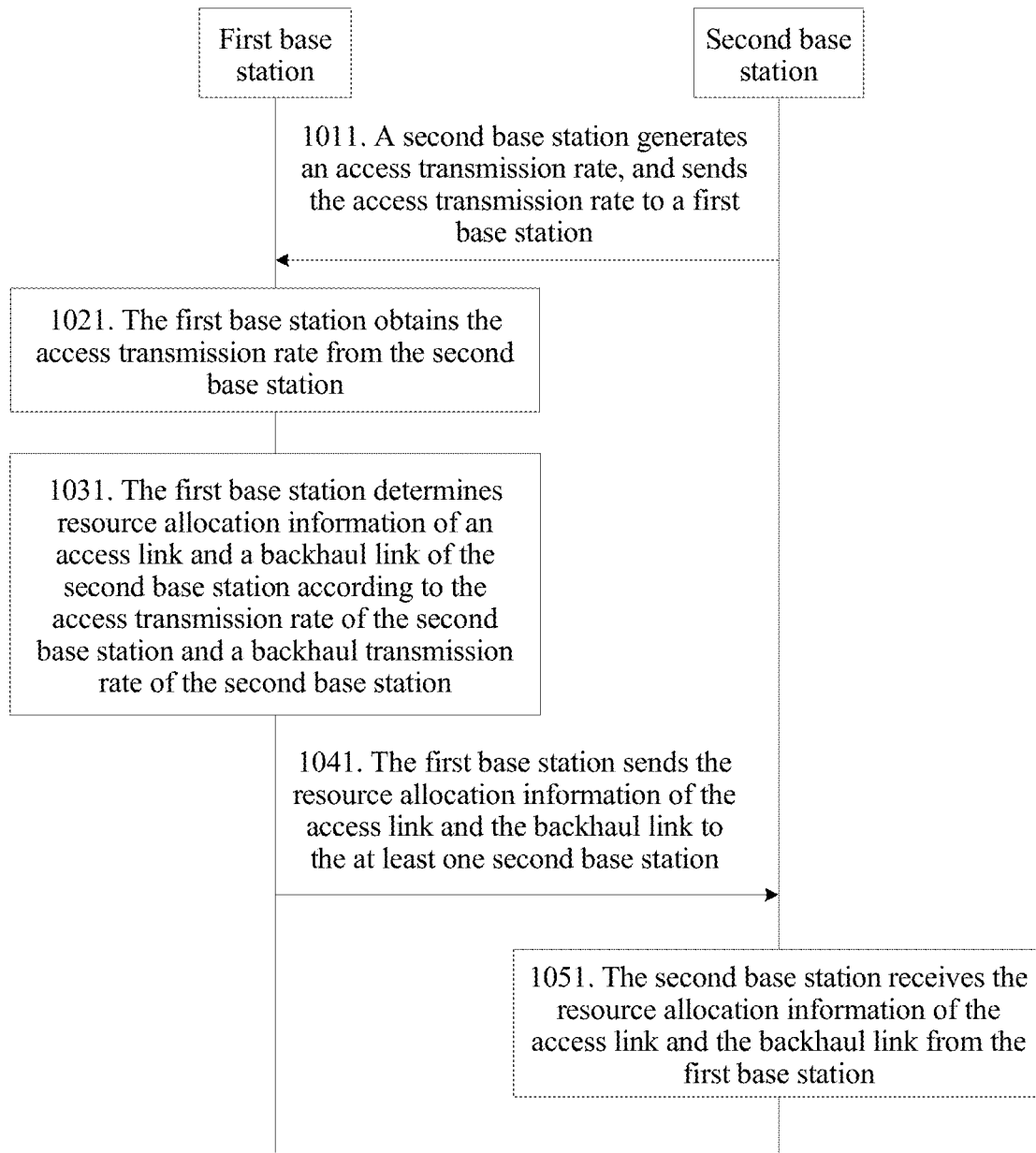
FIG. 2 is a schematic flowchart of a resource allocation method according to an implementation manner of the present invention.

Various embodiments in accordance with the disclosure provide a resource allocation method. As shown in FIG. 2, this embodiment includes one first base station and one second base station. An implementation process of the resource allocation method is as follows.

At 1011: the second base station generates an access transmission rate, and sends the access transmission rate to the first base station. The access transmission rate is a ratio of a total throughput, of all user equipments for which the second base station performs scheduling, to a total bandwidth occupied by all the user equipments.

The ratio of the total throughput, of all the user equipments for which the second base station performs scheduling, to the total bandwidth may be obtained according to channel quality information reported by all the user equipments to the second base station. For example, a given user equipment may report a signal to interference plus noise ratio (SINR) or a channel quality indicator (CQI) to the second base station. The user equipments may periodically send the channel quality information to the second base station, or may send the channel quality information to the second base station in response to an instruction from the second base station to obtain the channel quality information. After obtaining the access transmission rate, the second base station may periodically send the access transmission rate to the first base station, or may send the access transmission rate to the first base station in response to an instruction that is sent by the first base station for obtaining the access transmission rate.

At 1021: the first base station obtains the access transmission rate from the second base station. The access transmission rate is a ratio of a total throughput, of all user equipments for which at least one second base station performs scheduling, to a total bandwidth occupied by all the user equipments. Specifically, the first base station obtains access transmission rates of all second base stations that are connected to the first base station through backhaul links.

At 1031: the first base station determines resource allocation information of an access link and a backhaul link of the second base station according to the access transmission rate of the second base station and a backhaul transmission rate of the second base station. The backhaul transmission rate is a ratio of a total throughput of the backhaul link of the second base station to a total bandwidth of the backhaul link, may be equivalent to spectral efficiency of the backhaul link of the second base station, and is allocated by the first base station. In this embodiment, the first base station determines the resource allocation information of the access link and the backhaul link of the second base station according to a ratio of the access transmission rate of the second base station to the backhaul transmission rate of the second base station. The ratio may be a proportion of the access transmission rate to the backhaul transmission rate, or may be a proportion of the backhaul transmission rate to the access transmission rate.

At 1041: the first base station sends the resource allocation information of the access link and the backhaul link to the second base station, so that the second base station allocates a transmission resource to the access link and the backhaul link according to the resource allocation information of the access link and the backhaul link. After step 1041, the first base station further sends the resource allocation information of the access link and the backhaul link of the second base station to at least one user equipment for which the second base station performs scheduling, so that the at least one user equipment performs communication according to the resource allocation information of the access link and the backhaul link.

At 1051: the second base station receives the resource allocation information of the access link and the backhaul link from the first base station, and allocates a transmission resource to the access link and the backhaul link according to the resource allocation information of the access link and the backhaul link. Specifically, the second base station may allocate a frequency-domain resource to the access link and the backhaul link according to the resource allocation information, or may allocate a time-domain resource to the access link and the backhaul link according to the resource allocation information. After receiving the resource allocation information of the access link and the backhaul link from the first base station, the second base station may further send the resource allocation information of the access link and the backhaul link to the at least one user equipment for which the second base station performs scheduling, so that the at least one user equipment performs communication according to the resource allocation information of the access link and the backhaul link.

Figure 3:
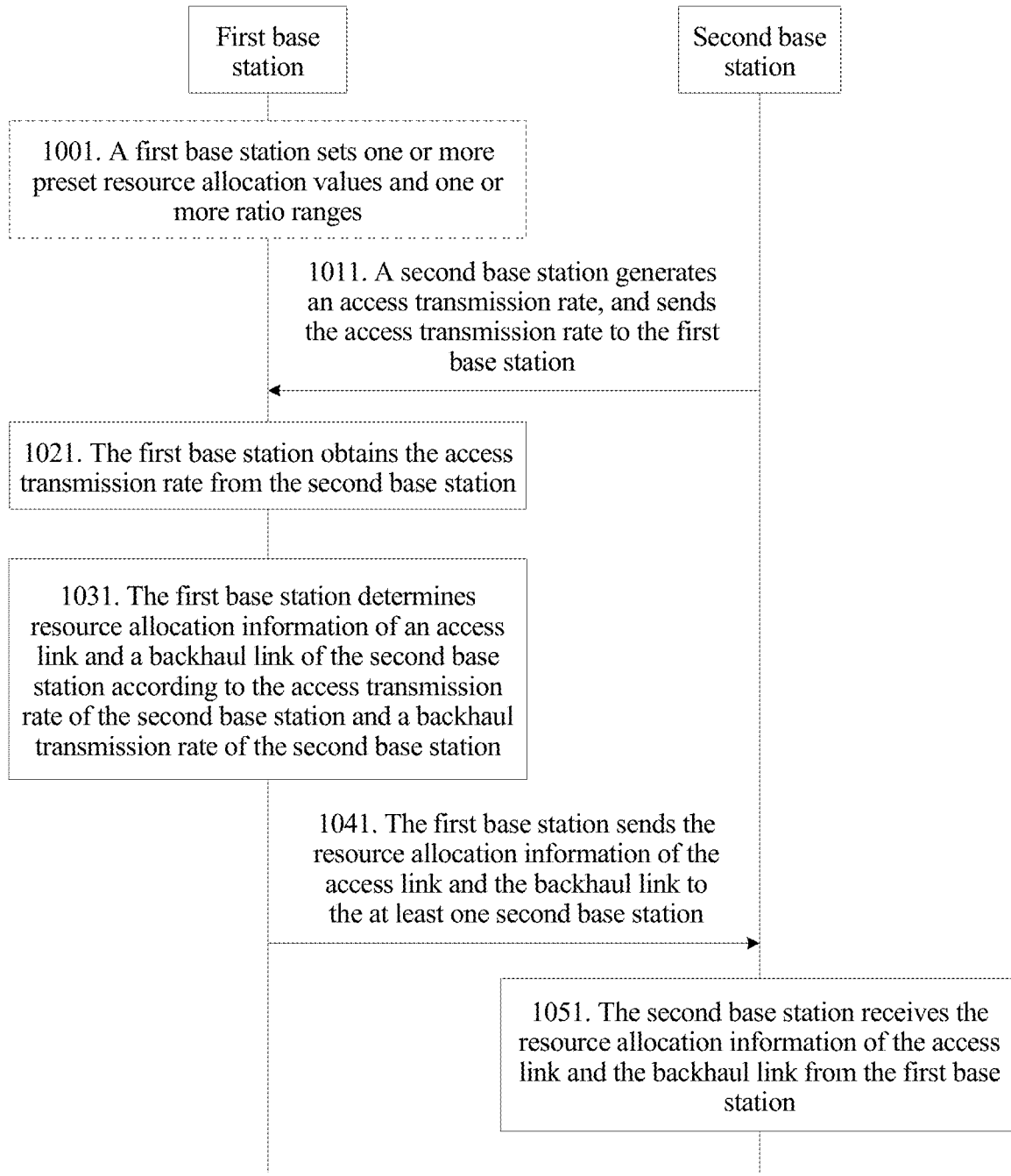
FIG. 3 is a schematic flowchart of a resource allocation method according to another implementation manner of the present invention.

Referring to FIG. 3, where another embodiment is shown. As shown, before step 1011, the method illustrated in FIG. 2 and described above may further include:

At 1001: the first base station sets one or more preset resource allocation values and one or more ratio ranges. Each preset resource allocation value corresponds to one ratio range. Specifically, the preset value may be set according to a historical transmission resource ratio that is between the access link and the backhaul link and that makes an overall system throughput relatively high.

Step 1031 may further include:
determining, by the first base station, a corresponding ratio range according to the ratio of the access transmission rate of the second base station to the backhaul transmission rate of the second base station; and
matching a corresponding preset resource allocation value according to the corresponding ratio range, and determining the matched preset resource allocation value as the resource allocation information of the access link and the backhaul link of the second base station.

The following describes a backhaul bandwidth, an access bandwidth, and a total throughput (which includes a sum of a throughput of an access link and a throughput of a backhaul link) of a second base station. The second base station centrally allocates the backhaul bandwidth and the access bandwidth. It is assumed that the backhaul bandwidth is $B^{BH}$ and the access bandwidth is $B^{RA}$. Therefore, a sum of the backhaul bandwidth and the access bandwidth is a fixed value:

$$B^{BH}+B^{RA}=B.$$

It is assumed that $R^{BH}$ represents a backhaul transmission rate, and the backhaul transmission rate is a ratio of a total throughput of the backhaul link of the second base station to a total bandwidth of the backhaul link. It is assumed that $R^{RA}$ represents an access transmission rate, and the access transmission rate is a ratio of a total throughput, of all user equipments for which the second base station performs scheduling, to a total bandwidth occupied by all the user equipments. The total throughput T is determined by a smaller throughput of the throughput of the access link and the throughput of the backhaul link):

$$T=\min(T^{BH},T^{RA})=\min(R^{BH}B^{BH},R^{RA}B^{RA}).$$

Figure 4:
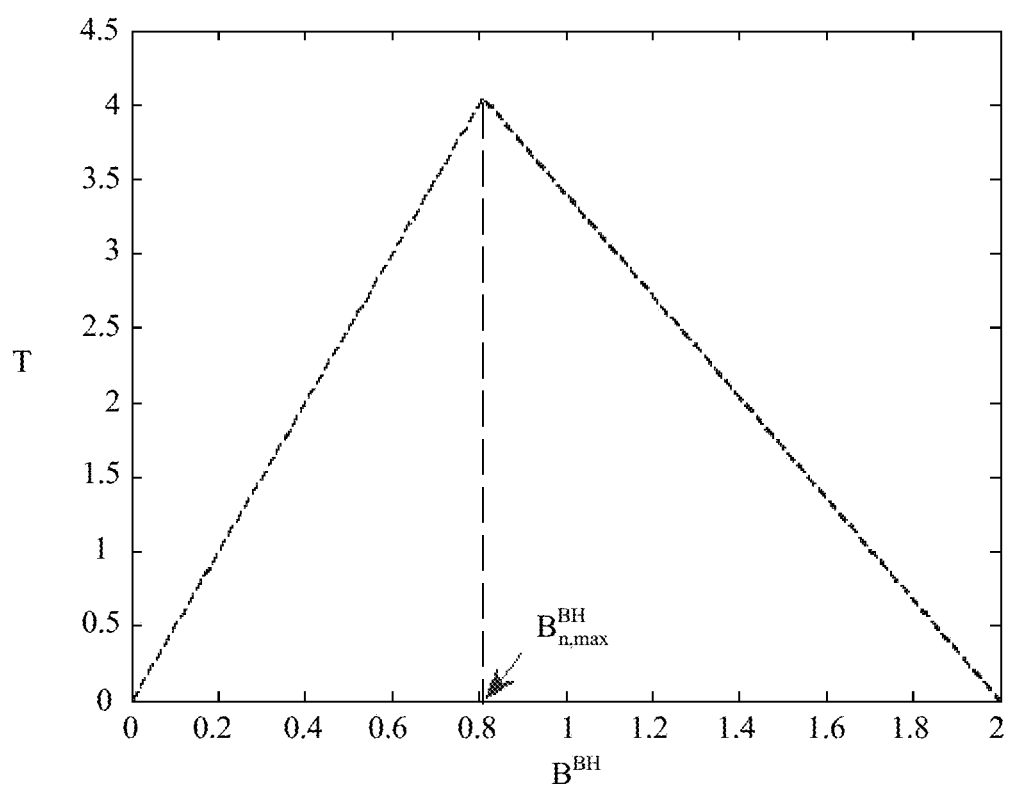
FIG. 4 is a schematic diagram of a function of a total throughputs of a second base stations and a backhaul bandwidth according to an implementation manner of the present invention.

Referring to FIG. 4, FIG. 4 is a function of a total throughput of a second base station and a backhaul bandwidth. It can be learned that the function is a triangular function. A slope of a part that linearly increases is a backhaul transmission rate, and a slope of a part that linearly decreases is an access transmission rate.

Figure 5:
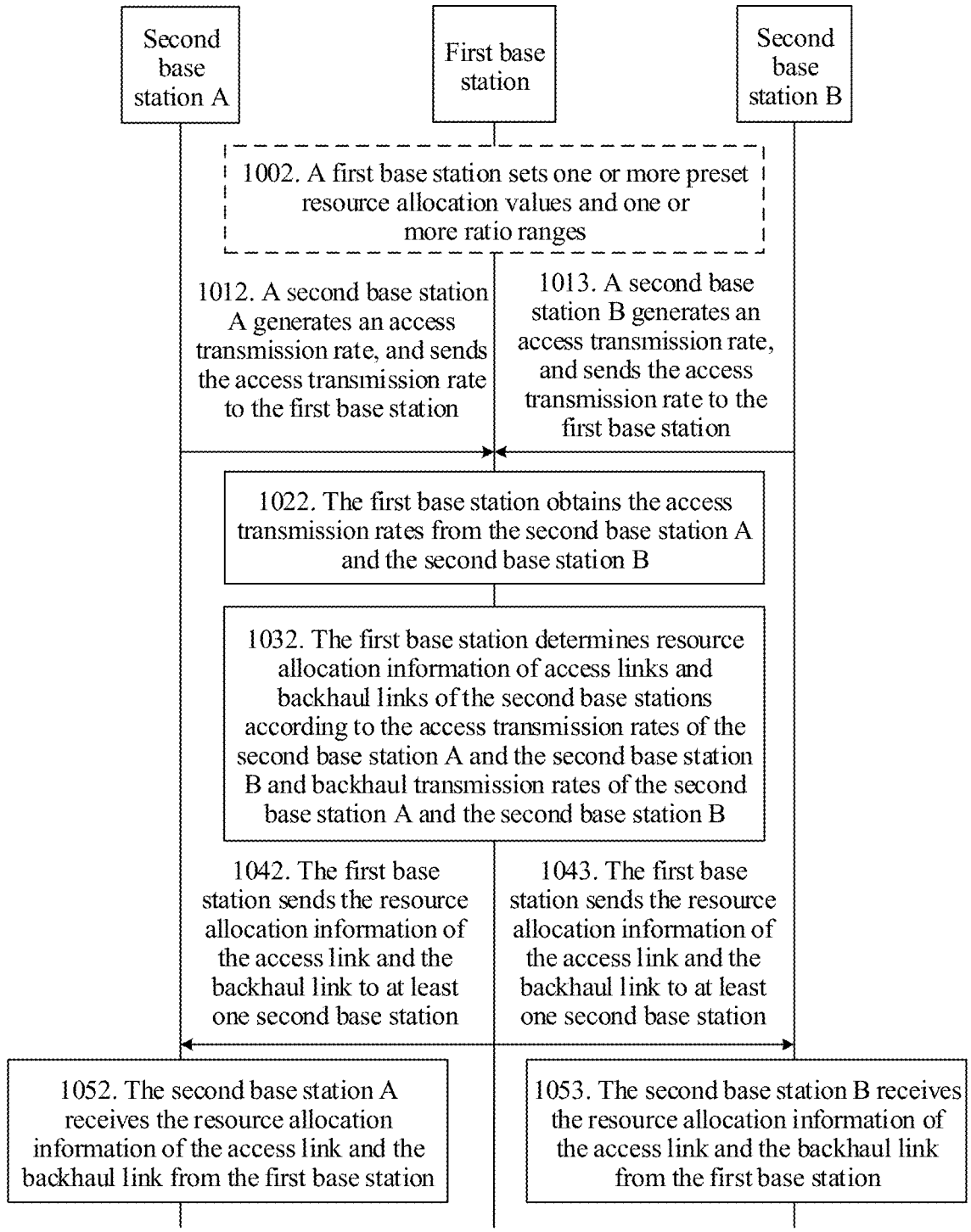
FIG. 5 is a schematic flowchart of a resource allocation method according to another implementation manner of the present invention.

Various embodiments in accordance with the disclosure can provide a resource allocation method that is used for resource allocation of access links and backhaul links of at least two second base stations. The following describes, by way of example, such a resource allocation method by using only two second base stations. It is understood that a method for implementing at least three second base stations are similar to the two base station example illustrated in FIG. 4, and details for implementing the three or more base stations are thus not described herein. As shown in FIG. 5, two second base stations are connected to a first base station by using backhaul links, and the two second base stations are respectively a second base station A and a second base station B. An implementation process of the resource allocation method is as follows:

At 1012: the second base station A generates an access transmission rate, and sends the access transmission rate to the first base station. This step are similar to step 1011, and is thus not described in details herein again.

1013. The second base station B generates an access transmission rate, and sends the access transmission rate to the first base station. This step are similar to those of step 1011, and is not described herein again. It should be noted that a sequence of performing step 1012 and step 1013 is not limited herein. That is, step 1012 may be performed after step 1013, or step 1012 and step 1013 may be simultaneously performed.

At 1022: the first base station obtains the access transmission rates from the second base station A and the second base station B. The access transmission rate is a ratio of a total throughput, of all user equipments for which at least one second base station performs scheduling, to a total bandwidth occupied by all the user equipments. Specific details of this step are similar to those of step 1021, and details are not described herein again.

At 1032: the first base station determines resource allocation information of access links and backhaul links of the second base station A and the second base station B according to the access transmission rates of the second base station A and the second base station B and backhaul transmission rates of the second base station A and the second base station B. In this embodiment, two second base stations are included. An obtaining method in which the first base station obtains resource allocation information of access links and backhaul links of two second base stations according to access transmission rates of the two second base stations and backhaul transmission rates of the two second base stations is to be described subsequently.

At 1042: the first base station sends the resource allocation information of the access link and the backhaul link to the second base station A. This step are similar to those of step 1041, and is thus not described in details herein again.

At 1043: the first base station sends the resource allocation information of the access link and the backhaul link to the second base station B. Specific details of this step are similar to those of step 1041, and details are not described herein again. It should be noted that a sequence of performing step 1042 and step 1043 is not limited herein. That is, step 1042 may be performed after step 1043, or step 1042 and step 1043 may be simultaneously performed.

At 1052 the second base station A receives the resource allocation information of the access link and the backhaul link from the first base station. This step are similar to step 1051, and is thus not described in details herein again.

At 1053: the second base station B receives the resource allocation information of the access link and the backhaul link from the first base station. This step is similar to step 1051, and is thus not described in details herein again. It should be noted that a sequence of performing step 1052 and step 1053 is not limited herein. That is, step 1052 may be performed after step 1053, or step 1052 and step 1053 may be simultaneously performed. Optionally, the second base station A and the second base station B further send the resource allocation information of the access link and the backhaul link to at least one user equipment respectively scheduled by the second base station A and the second base station B, so that the at least one user equipment performs communication according to the resource allocation information of the access link and the backhaul link.

The following further describes a step that the first base station determines resource allocation information of access links and backhaul links of at least two second base stations according to access transmission rates of the at least two second base stations and backhaul transmission rates of the at least two second base stations.

In a first solution, the step that the first base station determines resource allocation information of access links and backhaul links of at least two second base stations according to access transmission rates of the at least two second base stations and backhaul transmission rates of the at least two second base stations specifically includes:

determining a minimum access transmission rate and a minimum backhaul transmission rate according to the access transmission rates of the at least two second base stations and the backhaul transmission rates of the at least two second base stations, and determining a ratio of the minimum access transmission rate to the minimum backhaul transmission rate; and determining the resource allocation information of the access links and the backhaul links of the at least two base stations according to the ratio of the minimum access transmission rate to the minimum backhaul transmission rate.

Specifically, it is assumed that backhaul bandwidths of N second base stations are all $B^{BH}$, and N is a positive integer greater than or equal to 2. When a total throughput of an $N^{th}$ base station is $Tn(B^{BH})$, a minimum total throughput of the N second base stations is as follows:

$$T_{min}(B^{BH})=\min(T_1,T_2,\ldots,T_N).$$

Figure 6:
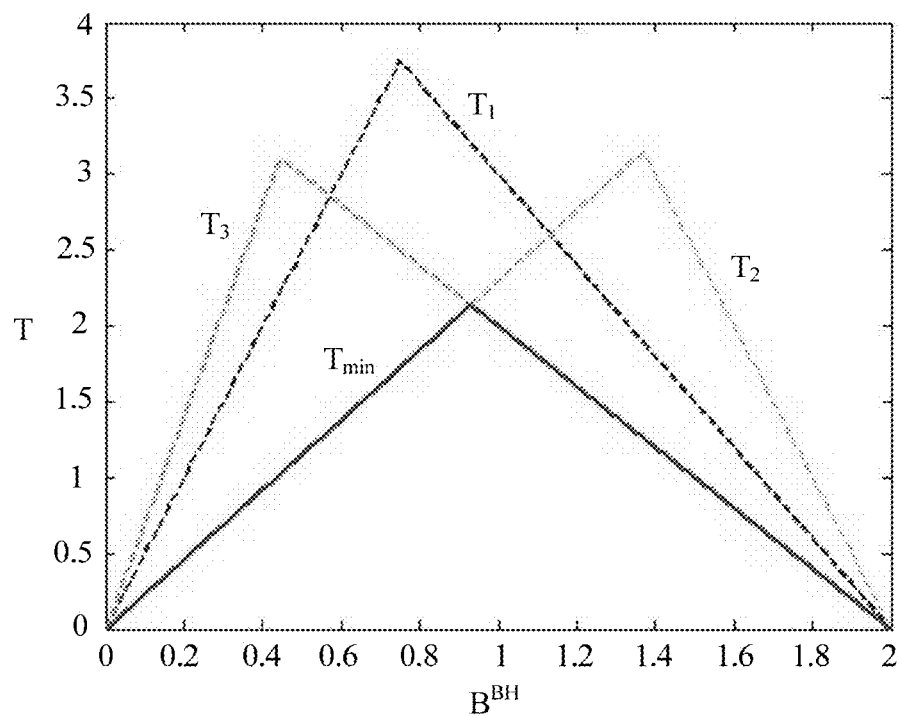
FIG. 6 is a schematic diagram of functions of total throughputs of three second base stations and a backhaul bandwidth and a function of a minimum total throughput of the total throughputs of the three second base stations and a backhaul bandwidth according to another implementation manner of the present invention.

As shown in FIG. 6, for example, N=3. $T_1$, $T_2$, and $T_3$ respectively represent functions of throughputs of three second base stations, and $T_{min}$ represents a function of a minimum total throughput of the three second base stations. A highest point in $T_{min}$ is a maximum value of the minimum throughput of the three second base stations, and determines a backhaul bandwidth $B_{n,max}^{BH}$ corresponding to the maximum value. It can be learned from analysis that, when a backhaul bandwidth is given, a minimum throughput of the second base stations is determined by a current minimum access transmission rate and a current minimum backhaul transmission rate. Therefore, the resource allocation information of the access links and the backhaul links of the at least two second base stations is determined according to the ratio of the minimum access transmission rate to the minimum backhaul transmission rate. The ratio may be a proportion of the minimum access transmission rate to the minimum backhaul transmission rate, or may be a proportion of the minimum backhaul transmission rate to the minimum access transmission rate, so as to optimize the minimum throughput. In another implementation manner, to implement different optimization purposes, the first base station may further determine the resource allocation information of the access links and the backhaul links of the at least two second base stations according to a ratio of a maximum access transmission rate of the at least two second base stations to a maximum backhaul transmission rate of the at least two second base stations; or may further determine the resource allocation information of the access links and the backhaul links of the at least two second base stations according to an average access transmission rate of the at least two second base stations and an average backhaul transmission rate of the at least two second base stations.

In a second solution, there are at least two second base stations, and the step that the first base station determines resource allocation information of access links and backhaul links of at least two second base stations according to access transmission rates of the at least two second base stations and backhaul transmission rates of the at least two second base stations specifically includes the following steps.

A maximum throughput of each second base station and a backhaul bandwidth corresponding to the maximum throughput are obtained according to an access transmission rate of each second base station.

A backhaul bandwidth at a highest point, that is, a backhaul bandwidth that maximizes a total throughput of the second base station, may be obtained according to the following expression:

$$B^{BH}_{max} = R^{RA} B / (R^{RA} + R^{BH}).$$

A backhaul bandwidth that maximizes a sum of total throughputs of the at least two second base stations is obtained according to the backhaul bandwidths corresponding to the maximum total throughputs of the at least two second base stations. A second base station corresponding to the backhaul bandwidth that maximizes the sum of the total throughputs of the at least two second base stations is determined. A ratio of an access transmission rate, of the second base station corresponding to a maximum backhaul bandwidth, to a backhaul transmission rate of the second base station corresponding to the maximum backhaul bandwidth is determined.

Figure 7:
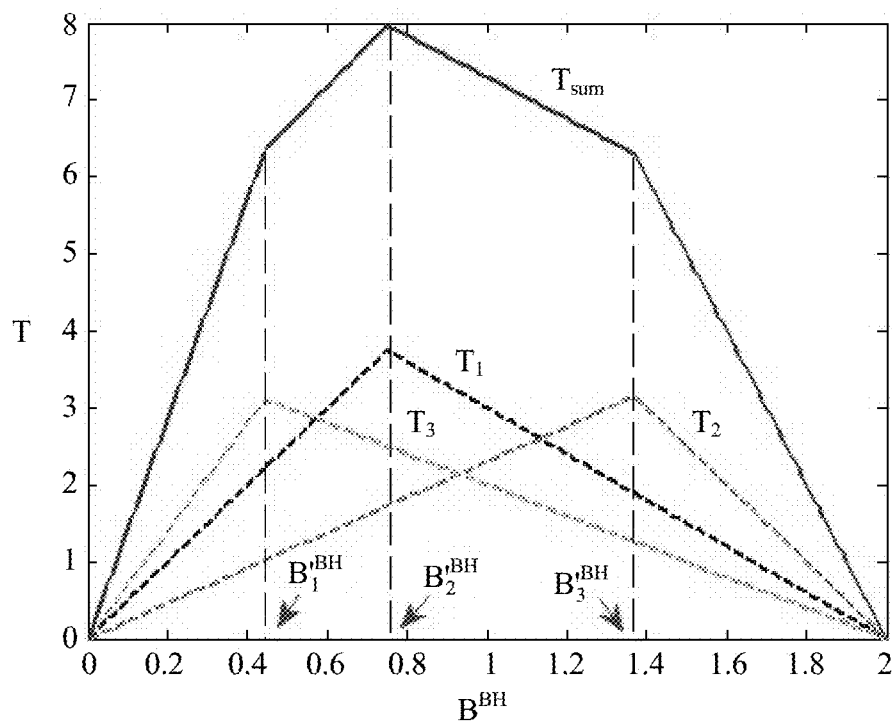
FIG. 7 is a schematic diagram of functions of total throughputs of three second base stations and a backhaul bandwidth and a function of a sum of the total throughputs of the three second base stations and a backhaul bandwidth according to another implementation manner of the present invention.

Specifically, functions of total throughputs of the at least two second base stations are shown in FIG. 7. The total throughput is a sum of an access throughput and a backhaul throughput. As shown in FIG. 7, a backhaul bandwidth corresponding to each turning point on a piecewise function is actually corresponding to a backhaul bandwidth corresponding to a maximum throughput of each second base station, and a start point and an end point of each interval of the piecewise function are accordingly determined.

A maximum throughput of each second base station per unit time and a backhaul bandwidth $B'^{BH}_N$ corresponding to the maximum throughput per unit time are obtained according to the access transmission rate and a backhaul transmission rate of each second base station. The backhaul bandwidth $B'^{BH}_N$ may be specifically obtained by using the following expression:

$$B'^{BH}_N = \frac{R^{AH}_N \times B}{R^{AH}_N + R^{BH}_N},$$

where $R^{AH}_N$ is an access transmission rate of an $N^{th}$ second base station, $R^{BH}_N$ is a backhaul transmission rate of the $N^{th}$ second base station, and B is a total bandwidth.

The obtained backhaul bandwidths of N second base stations are sorted in ascending order to obtain a bandwidth sequence:

$$[B'^{BH}_1, B'^{BH}_2, \ldots, B'^{BH}_N].$$

An access transmission rate sequence $[R^{RA}_1, R^{RA}_2, \ldots, R^{RA}_N]$ corresponding to the N second base stations and a backhaul transmission rate sequence $[R^{BH}_1, R^{BH}_2, \ldots, R^{BH}_N]$ corresponding to the N second base stations are listed according to the bandwidth sequence.

Within $[B'^{BH}_l, B'^{BH}_{l+1}]$, access throughputs of l base stations are less than backhaul throughputs (which may be referred to as "access-limited"), and backhaul throughputs of remaining N−l base stations are less than access throughputs (which may be referred to as "backhaul-limited"). A sum of throughputs of the N base stations may be represented as follows:

$$\sum_{n=1}^{N} T_n = \sum_{i=l+1}^{N} R'^{BH}_i B^{BH} + \sum_{i=1}^{l} R'^{RA}_i (B - B^{BH}).$$

In this expression, a backhaul bandwidth is an independent variable, and $l_m$ is obtained by taking a derivative of the backhaul bandwidth. It indicates that the throughputs of the N base stations within $[B'^{BH}_{lm}, B'^{BH}_{lm+1}]$ are the highest, that is, $$\frac{\partial \left(\sum_{n=1}^{N} T_n\right)}{\partial B^{BH}} = \sum_{i=l+1}^{N} R'^{BH}_i - \sum_{i=1}^{l} R'^{RA}_i = 0.$$

This expression may also be considered as a slope of each segment of the piecewise function in FIG. 7. Because there is always one second base station that changes from "backhaul-limited" to "access-limited" at each turning point, the slope always decreases gradually before the highest point is reached. Similarly, because the slope increases gradually after the highest point is reached, an interval in which an absolute value of the slope is closest to zero is an interval that needs to be found. Therefore, the following sequence may be found:

$[R^{\prime BH}{}_{l+1}, R^{\prime BH}{}_{l+2}, \ldots, R^{\prime BH}{}_N]$ and $[R^{\prime RA}{}_1, R^{\prime RA}{}_2, \ldots, R^{\prime RA}{}_l]$.

A backhaul bandwidth is obtained that makes $$\sum_{i=l+1}^{N} R_i^{\prime BH} - \sum_{i=1}^{l} R_i^{\prime RA}$$

a minimum positive integer, and then is used as an optimal backhaul bandwidth, or a second base station corresponding to an optimal backhaul bandwidth may be found. The resource allocation information of the access links and the backhaul links of the at least two base stations is determined according to a ratio of an access transmission rate, of the second base station corresponding to the optimal backhaul bandwidth, to a backhaul transmission rate of the second base station. The ratio may be a proportion of the access transmission rate to the backhaul transmission rate, or may be a proportion of the backhaul transmission rate to the access transmission rate.

In the second optional solution, a total throughput of a second base station corresponding to an optimal backhaul bandwidth is the highest. A ratio of an access transmission rate of the corresponding second base station to a backhaul transmission rate of the corresponding second base station is determined as resource allocation information of access links and backhaul links of at least two base stations, so as to improve overall throughputs of the at least two second base stations.

In a third optional solution, there are at least two second base stations, and the step that the first base station determines resource allocation information of access links and backhaul links of at least two second base stations according to access transmission rates of the at least two second base stations and backhaul transmission rates of the at least two second base stations specifically includes the following steps.

Statistics about throughputs of each second base station per historical unit time are collected, and a historical throughput according to the throughputs of each second base station per historical unit time is obtained. The throughputs per historical unit time refer to throughputs of the second base station within a historical unit time. The historical throughput may be a sum of the throughputs of the second base station per historical unit time, or may be a value obtained by dividing a sum of the throughputs of the second base station per historical unit time by a unit time of statistics collection.

A maximum throughput per current unit time is determined according to an access transmission rate of each second base station and a backhaul transmission rate of each second base station. Referring to a function shown in FIG. 4, a highest point is the maximum throughput per current unit time.

A ratio of the maximum throughput of each second base station per current unit time to the historical throughput is determined as a satisfaction factor. It should be noted that if the first base station obtains the satisfaction factor within the first unit time, a throughput of each second base station per first unit time is used as the satisfaction factor.

The satisfaction factors of the at least two second base stations are compared. A second base station corresponding to a maximum satisfaction factor is determined. A ratio of an access transmission rate, of the second base station corresponding to the maximum satisfaction factor, to a backhaul transmission rate of the second base station is determined.

The resource allocation information of the access links and the backhaul links of the at least two base stations is determined according to the ratio of the access transmission rate, of the second base station corresponding to the maximum satisfaction factor, to the backhaul transmission rate of the second base station.

In the third optional solution, a larger satisfaction factor indicates relatively less previous transmission of a corresponding second base station, and a throughput of the second base station needs to be improved. Therefore, a ratio that is of an access transmission rate of a second base station to a backhaul transmission rate of the second base station and that can maximize a throughput of the second base station is used as a resource allocation ratio of the at least two second base stations, so as to improve a throughput of a second base station with relatively less transmission.

Referring to FIG. 5, optionally, before step 1012, the method shown in FIG. 5 may further include:

At 1002: the first base station sets one or more preset resource allocation values and one or more ratio ranges. Each preset resource allocation value is corresponding to one ratio range.

Specifically, the preset value may be set according to a historical transmission resource ratio that is between the access link and the backhaul link and that makes an overall system throughput relatively high.

Step 1032 may further include the following steps.

The first base station determines a corresponding ratio range according to the ratio of the access transmission rate to the backhaul transmission rate.

For example, when there are at least two second base stations, the first base station may determine a corresponding ratio range according to a ratio of a minimum access transmission rate of the at least two base stations to a minimum backhaul transmission rate of the at least two base stations; or may determine a corresponding ratio range according to a ratio of an average access transmission rate of the at least two base stations to an average backhaul transmission rate of the at least two base stations; or may determine a corresponding ratio range according to a ratio of a maximum access transmission rate of the at least two base stations to a maximum backhaul transmission rate of the at least two base stations; or may determine a corresponding ratio range according to a ratio of an access transmission rate, of a second base station corresponding to an optimal backhaul bandwidth in the at least second two base stations, to a backhaul transmission rate of the second base station; or may determine a corresponding ratio range according to a ratio of an access transmission rate, of a second base station with a largest satisfaction factor in the at least two base stations, to a backhaul transmission rate of the second base station.

A corresponding preset resource allocation value according to the determined corresponding ratio range is matched. The matched preset resource allocation value is determined as the resource allocation information of the access links and the backhaul links of the at least second two base stations.

In the resource allocation method disclosed in this embodiment, a first base station obtains access transmission rates and backhaul transmission rates of at least two second base stations; determines resource allocation information of access links and backhaul links of the at least two second base stations; and dynamically adjusts a resource allocation ratio between the access link and the backhaul link of the second base station according to the resource allocation information, so as to implement dynamic resource allocation and improve resource utilization.

Figure 8:
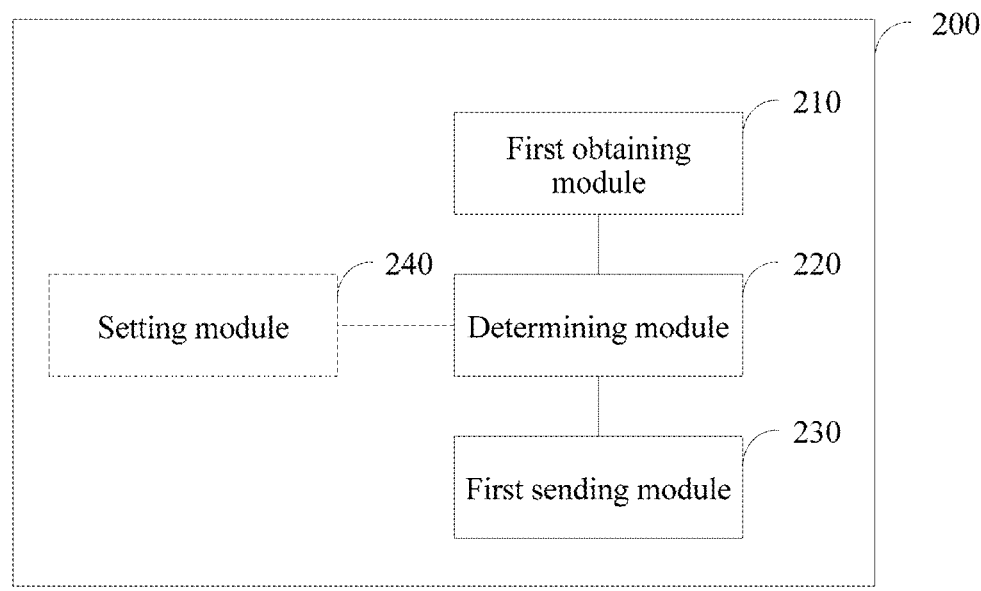
FIG. 8 is a schematic module diagram of a resource allocation apparatus according to an implementation manner of the present invention.

Another implementation manner of the present invention further discloses a schematic diagram of a resource allocation apparatus. Referring to FIG. 8, the resource allocation apparatus 200 is configured to perform steps 1021, 1031, and 1041 in the process shown in FIG. 2, or is configured to perform steps 1022, 1032, 1042, and 1043 in the process shown in FIG. 5. The resource allocation apparatus 200 includes a first obtaining module 210, a determining module 220, and a first sending module 230. It should be understood that, in specific application, the resource allocation apparatus 200 may be located in a network device such as a macro base station or a micro base station.

The first obtaining module 210 is configured to obtain an access transmission rate of at least one second base station. The access transmission rate is a ratio of a total throughput, of all user equipments for which the at least one second base station performs scheduling, to a total bandwidth occupied by all the user equipments, and the at least one second base station accesses the resource allocation apparatus by using a backhaul link.

The determining module 220 is configured to determine resource allocation information of an access link and the backhaul link of the at least one second base station according to the access transmission rate of the at least one second base station and a backhaul transmission rate of the at least one second base station. The backhaul transmission rate is a ratio of a total throughput of the backhaul link of the at least one second base station to a total bandwidth of the backhaul link.

Specifically, when there are at least two second base stations, for a specific method in which the determining module 220 determines resource allocation information of access links and backhaul links of the at least two second base stations, refer to the first to the third optional solutions in the implementation manner shown in FIG. 4. Details are not described herein again.

The first sending module 230 is configured to send the resource allocation information of the access link and the backhaul link to the at least one second base station, so that the at least one second base station allocates a transmission resource to the access link and the backhaul link according to the resource allocation information of the access link and the backhaul link. Optionally, the first sending module 230 is further configured to send the resource allocation information of the access link and the backhaul link to at least one user equipment for which the at least one second base station performs scheduling, so that the at least one user equipment performs communications according to the resource allocation information of the access link and the backhaul link.

Optionally, in another implementation manner, the resource allocation apparatus 200 further includes: a setting module 240, configured to perform step 1001 in the process shown in FIG. 3, or step 1002 in the process shown in FIG. 5.

The setting module 240 is configured to set one or more preset resource allocation values and one or more ratio ranges. Each preset resource allocation value is corresponding to one ratio range. The preset value may be correspondingly set according to different optimization purposes.

The determining module 220 is further configured to determine a corresponding ratio range according to a determined ratio of the access transmission rate to the backhaul transmission rate; and match a corresponding preset resource allocation value according to the corresponding ratio range, and determine the matched preset resource allocation value as the resource allocation information of the access links and the backhaul links of the at least two second base stations.

Figure 9:
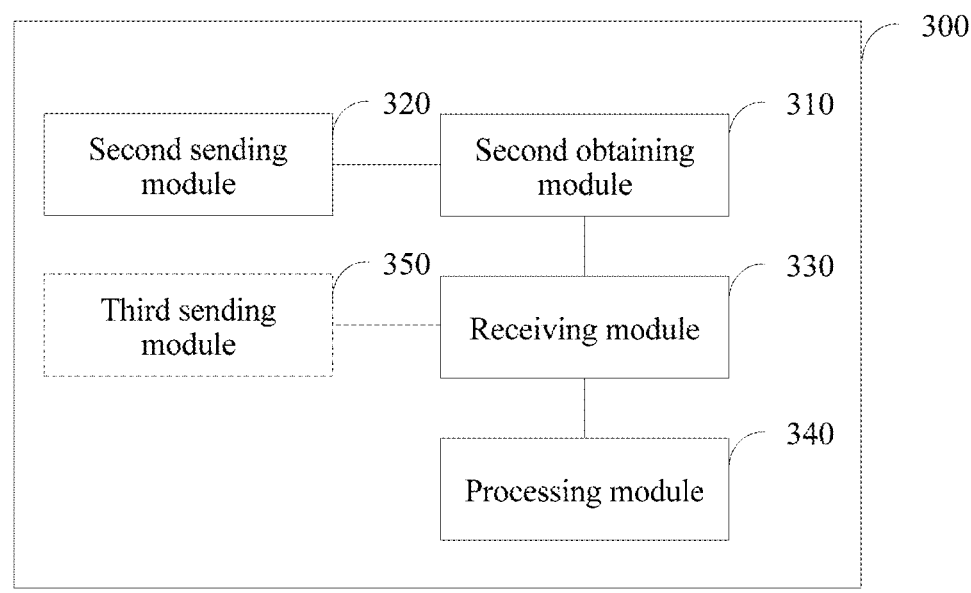
FIG. 9 is a schematic module diagram of a base station according to an implementation manner of the present invention.

FIG. 9 is a schematic module diagram of a base station disclosed in another embodiment. The base station accesses a first base station by using a wireless backhaul link. The base station shown in FIG. 9 may be equivalent to a second base station that accesses the first base station by using a backhaul link, or may be one of multiple second base stations that access the first base station by using wireless backhaul links. The base station 300 shown in FIG. 9 is configured to perform steps 1011, 1041, and 1051 in the process shown in FIG. 2, or is configured to perform steps 1012, 1013, 1042, 1043, 1052, and 1053 in the process shown in FIG. 5. The base station 300 includes a second obtaining module 310, a second sending module 320, a receiving module 330, and a processing module 340.

The second obtaining module 310 is configured to obtain an access transmission rate of the base station. The access transmission rate is a ratio of a total throughput, of all user equipments for which the base station performs scheduling, to a total bandwidth occupied by all the user equipments.

The second sending module 320 is configured to send the access transmission rate obtained by the second obtaining module 310 to the first base station.

The receiving module 330 is configured to receive resource allocation information of an access link and the backhaul link from the first base station. The resource allocation information of the access link and the backhaul link is determined by the first base station according to the access transmission rate of the base station and a backhaul transmission rate of the base station, and the backhaul transmission rate is a ratio of a total throughput of the backhaul link of the base station to a total bandwidth of the backhaul link.

The processing module 340 is configured to allocate a transmission resource to the access link and the backhaul link of the base station 300 according to the resource allocation information of the access link and the backhaul link.

Optionally, the base station 300 further includes: a third sending module 350, configured to send the resource allocation information of the access link and the backhaul link to at least one user equipment, so that the at least one user equipment performs communication according to the resource allocation information of the access link and the backhaul link.

Another embodiment further provides a resource allocation system that includes the resource allocation apparatus 200 shown in FIG. 8, and at least one base station 300 shown in FIG. 9. The at least one base station 300 accesses the resource allocation apparatus 200 by using a wireless backhaul link. For the resource allocation apparatus 200, refer to descriptions corresponding to FIG. 8. For the base station 300, refer to descriptions corresponding to FIG. 9. Details are not described herein again.

In addition, modules in the implementation manners of the present invention may be integrated into one processing module, or each of the modules may exist alone physically, or at least two modules are integrated into one larger module. The integrated module may be implemented in a form of hardware, or may be implemented in a form of a software functional module. Steps of the methods disclosed with reference to the implementation manners of the present invention may be directly performed by a hardware encoding processor, or may be performed by using a combination of hardware and software modules in the encoding processor. A software module may be located in a storage medium, such as a random access memory, a flash memory, a read-only memory, a programmable read-only memory, an electrically-erasable programmable memory, or a register.

If the module or the integrated module is implemented in the form of hardware, the module or the integrated module may be an integrated circuit (IC), an application-specific integrated circuit (ASIC), a field-programmable gate array (FPGA), or the like, or may be integrated into a baseband processor or a general purpose processor.

When the module or the integrated module is implemented in the form of a software functional module and sold or used as an independent product, the module or the integrated module may be stored in a computer-readable storage medium. Based on such an understanding, the technical solutions of the present invention essentially, or the part contributing to the prior art, or all or some of the technical solutions may be implemented in the form of a software product. The software product is stored in a storage medium, and includes several instructions for instructing a device (which may be a personal computer, a server, or a network device such as a base station) with a computation function to perform all or some of the steps of the methods described in the implementation manners of the present invention. The storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A resource allocation method, comprising:
    obtaining, by a first base station, an access transmission rate of at least one second base station, wherein
        the access transmission rate is a ratio of a total throughput, to a total bandwidth occupied by all user equipments, the throughput being of all user equipments for which the at least one second base station performs scheduling, and
        the at least one second base station accesses the first base station by using a backhaul link;
    determining, by the first base station, resource allocation information of an access link and the backhaul link of the at least one second base station according to the access transmission rate of the at least one second base station and a backhaul transmission rate of the at least one second base station, wherein the backhaul transmission rate is a ratio of a total throughput of the backhaul link of the at least one second base station to a total bandwidth of the backhaul link; and
    sending, by the first base station, the resource allocation information of the access link and the backhaul link to the at least one second base station; and
    sending, by the first base station, the resource allocation information of the access link and the backhaul link to at least one user equipment, so that the at least one user equipment performs communication according to the resource allocation information of the access link and the backhaul link.

2. The resource allocation method according to claim 1, wherein the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station comprises:
    determining a first ratio of a minimum access transmission rate to a minimum backhaul transmission rate according to access transmission rates of the at least two second base stations and backhaul transmission rates of the at least two second base stations; and
    determining resource allocation information of access links and backhaul links of the at least two base stations according to the first ratio.

3. The resource allocation method according to claim 1, wherein the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station comprises:
    determining a first ratio of a maximum access transmission rate to a maximum backhaul transmission rate according to access transmission rates of the at least two second base stations and backhaul transmission rates of the at least two second base stations; and
    determining resource allocation information of access links and backhaul links of the at least two base stations according to the first ratio.

4. The resource allocation method according to claim 1, wherein the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station comprises:
    determining a first ratio of an average access transmission rate to an average backhaul transmission rate according to access transmission rates of the at least two second base stations and backhaul transmission rates of the at least two second base stations; and
    determining resource allocation information of access links and backhaul links of the at least two base stations according to the first ratio.

5. The resource allocation method according to claim 1, wherein the at least one second base station is specifically at least two second base stations, and the determining, by the first base station, resource allocation information of an access link and the backhaul link of the at least one second base station according to the access transmission rate of the at least one second base station and a backhaul transmission rate of the at least one second base station comprises:
    obtaining, according to an access transmission rate of each second base station and a backhaul transmission rate of each second base station, a maximum throughput of each second base station and a backhaul bandwidth corresponding to the maximum throughput;
    obtaining, according to the backhaul bandwidth corresponding to the maximum throughputs of the at least two second base stations, a backhaul bandwidth that maximizes a sum of overall throughputs of the at least two second base stations; determining a second base station corresponding to the backhaul bandwidth that maximizes the sum of the overall throughputs of the at least two second base stations; and determining a first ratio of an access transmission rate of the corresponding second base station to a backhaul transmission rate of the corresponding second base station; and determining resource allocation information of access links and backhaul links of the at least two base stations according to the first ratio.

6. A resource allocation apparatus, comprising:

a non-transitory memory storage comprising instructions; and one or more processors in communication with the memory, wherein the one or more processors are configured to execute the instructions to:

obtain an access transmission rate of at least one second base station, wherein the access transmission rate is a ratio of a total throughput to a total bandwidth occupied by all user equipments, the throughput being of all user equipments for which the at least one second base station performs scheduling, and the at least one second base station accesses the resource allocation apparatus by using a backhaul link;

determine resource allocation information of an access link and the backhaul link of the at least one second base station according to the access transmission rate of the at least one second base station and a backhaul transmission rate of the at least one second base station, wherein the backhaul transmission rate is a ratio of a total throughput of the backhaul link of the at least one second base station to a total bandwidth of the backhaul link; and send the resource allocation information of the access link and the backhaul link to the at least one second base station; and send the resource allocation information of the access link and the backhaul link to at least one user equipment, so that the at least one user equipment performs communication according to the resource allocation information of the access link and the backhaul link.

7. The resource allocation apparatus according to claim 6, wherein the at least one second base station is at least two second base stations, and the determining module is configured to:

determine a first ratio of a minimum access transmission rate to a minimum backhaul transmission rate according to access transmission rates of the at least two second base stations and backhaul transmission rates of the at least two second base stations; and determine resource allocation information of access links and backhaul links of the at least two second base stations according to the first ratio.

8. The resource allocation apparatus according to claim 6, wherein the at least one second base station is at least two second base stations, and the determining module is configured to:

determine a first ratio of a maximum access transmission rate to a maximum backhaul transmission rate according to access transmission rates of the at least two second base stations and backhaul transmission rates of the at least two second base stations; and determine resource allocation information of access links and backhaul links of the at least two second base stations according to the first ratio.

9. The resource allocation apparatus according to claim 6, wherein the at least one second base station is at least two second base stations, and the determining module is configured to:

determine a first ratio of an average access transmission rate to an average backhaul transmission rate according to access transmission rates of the at least two second base stations and backhaul transmission rates of the at least two second base stations; and determine resource allocation information of access links and backhaul links of the at least two second base stations according to the first ratio.

10. The resource allocation apparatus according to claim 6, wherein the at least one second base station is at least two second base stations, and the determining module is configured to:

obtain, according to an access transmission rate of each second base station and a backhaul transmission rate of each second base station, a maximum throughput of each second base station and a backhaul bandwidth corresponding to the maximum throughput;

obtain, according to the backhaul bandwidth corresponding to the maximum throughputs of the at least two second base stations, a backhaul bandwidth that maximizes a sum of overall throughputs of the at least two second base stations; determine a second base station corresponding to the backhaul bandwidth that maximizes the sum of the overall throughputs of the at least two second base stations; and determine a first ratio of an access transmission rate of the corresponding second base station to a backhaul transmission rate of the corresponding second base station; and determine resource allocation information of access links and backhaul links of the at least two second base stations according to the first ratio.

11. The resource allocation apparatus according to claim 6, wherein the at least one second base station is at least two second base stations, and the determining module is configured to:

collect statistics about throughputs of each second base station per historical unit time, and obtain a historical throughput and a maximum throughput per unit time according to the throughputs of each second base station per historical unit time;

determine a maximum throughput per current unit time according to an access transmission rate of each second base station and a backhaul transmission rate of each second base station;

determine, as a satisfaction factor, a second ratio of the maximum throughput of each second base station per current unit time to the historical throughput;

compare satisfaction factors of the at least two second base stations, determine a maximum satisfaction factor and a corresponding second base station, and determine a first ratio of an access transmission rate of the corresponding second base station to a backhaul transmission rate of the corresponding second base station; and determine resource allocation information of access links and backhaul links of the at least two second base stations according to the first ratio.

12. The resource allocation apparatus according to claim 6, wherein the apparatus further comprises:

a setting module, configured to set one or more preset resource allocation values and one or more ratio ranges, wherein each preset resource allocation value is corresponding to one ratio range; and the determining module is configured to:

determine a corresponding ratio range according to a first ratio; and match a corresponding preset resource allocation value according to the corresponding ratio range, and determine the matched preset resource allocation value as the resource allocation information of the access links and the backhaul links of the at least two base stations.

13. The resource allocation apparatus according to claim 6, wherein the second base station is a high-frequency base station.

14. A second base station, comprising:
a non-transitory memory storage comprising instructions; and
one or more processors in communication with the memory, wherein the one or more processors are configured to execute the instructions to:
obtain an access transmission rate of the second base station, wherein the access transmission rate is a ratio of a total throughput to a total bandwidth occupied by all user equipments, the throughput being of all user equipments for which the second base station performs scheduling, and the second base station accesses a first base station by using a wireless backhaul link;
send the access transmission rate obtained by the second obtaining module to the first base station;
receive resource allocation information of an access link and the backhaul link from the first base station, wherein the resource allocation information of the access link and the backhaul link is determined by the first base station according to the access transmission rate of the second base station and a backhaul transmission rate of the second base station, and the backhaul transmission rate is a ratio of a total throughput of the backhaul link of the second base station to a total bandwidth of the backhaul link; and
allocate a transmission resource to the access link and the backhaul link of the second base station according to the resource allocation information of the access link and the backhaul link; and
send the resource allocation information of the access link and the backhaul link to at least one user equipment, so that the at least one user equipment performs communication according to the resource allocation information of the access link and the backhaul link.

15. The second base station according to claim 14, wherein the second base station is a high-frequency base station.

* * * * *